United States Patent [19]
Mosher et al.

[11] Patent Number: 5,164,868
[45] Date of Patent: Nov. 17, 1992

[54] MAGNETIC TAPE THREADING AND COMPLIANCE ELEMENT GUIDING APPARATUS

[75] Inventors: George E. Mosher, Bellflower; John P. Grant, Downey; Henry M. Martija, Laverne, all of Calif.

[73] Assignee: Datatape Incorporated, Pasadena, Calif.

[21] Appl. No.: 712,822

[22] Filed: Jun. 10, 1991

[51] Int. Cl.$^5$ ............................................. G11B 5/027
[52] U.S. Cl. ...................................... 360/85; 360/95; 360/96.2
[58] Field of Search ........................... 360/85, 95, 96.2

[56] References Cited

U.S. PATENT DOCUMENTS 4,947,101  11/1990  Sturm ............................... 360/85 X
4,991,038  2/1991  Grant .................................... 360/85

Primary Examiner—A. J. Heinz
Attorney, Agent, or Firm—William F. Noval

[57] ABSTRACT

A helical scan magnetic tape recorder includes tape threading and guiding apparatus for threading magnetic tape from a two reel cassette about a rotary magnetic head scanner and for tensioning the tape during tape transport. The threading and guiding apparatus includes supply and take-up compliance elements which are mounted for movement between (1) cassette loading positions behind a tape span in a magnetic tape cassette; (2) tape vacuum loading positions in which the elements draw tape out of the cassette and partially contact it with the rotary head scanner; and (3) operating positions in which the elements draw tape around the respective supply and take-up capstans and tension the tape during tape transport past the rotary head scanner.

4 Claims, 5 Drawing Sheets

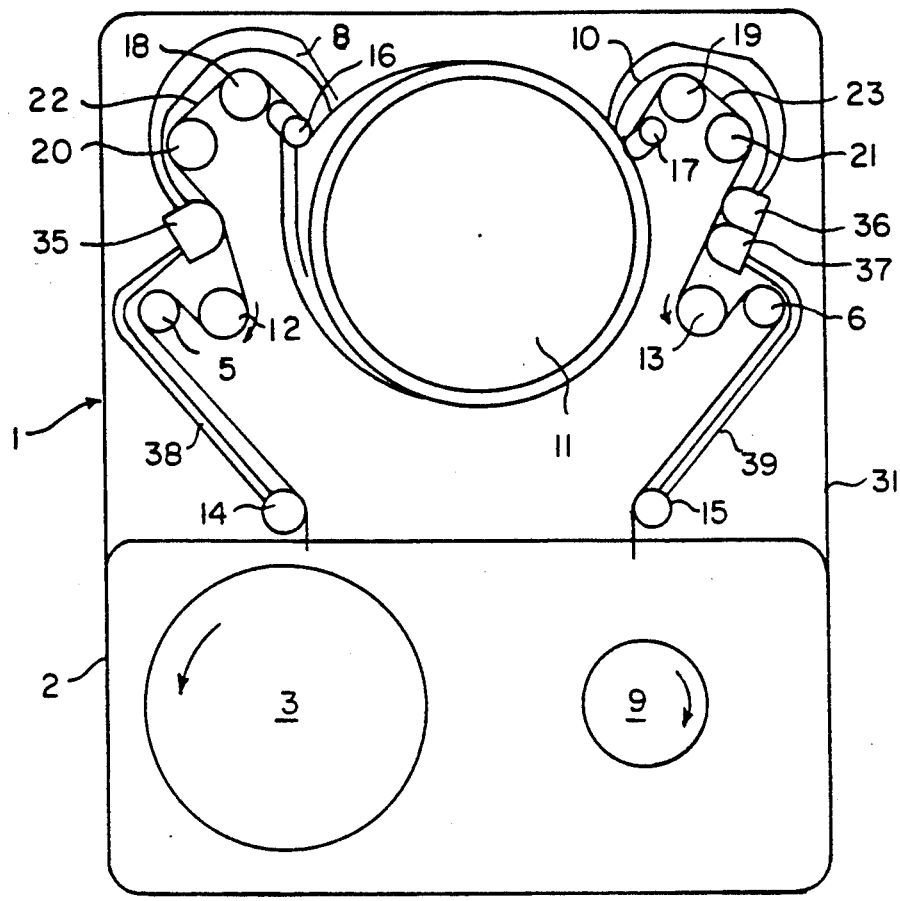
FIG. 3
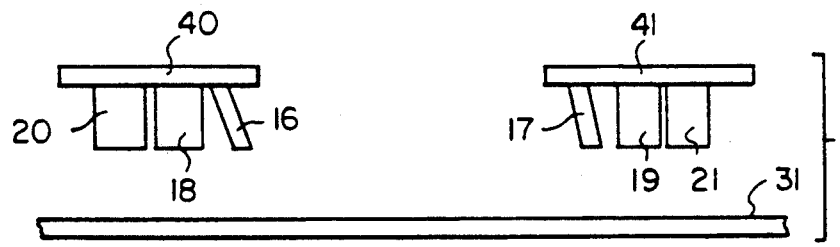
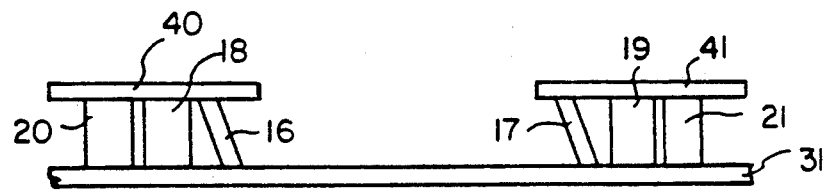
FIG. 5

MAGNETIC TAPE THREADING AND COMPLIANCE ELEMENT GUIDING APPARATUS

BACKGROUND OF THE INVENTION

This invention relates in general to magnetic tape recording/reproducing apparatus and more particularly to a helical scan magnetic tape recorder/player.

Various techniques have been proposed for use in magnetic tape recorder/players for threading magnetic tape from a cassette into a tape transport path and for guiding the tape along such path. Both manual and automatic mechanical arrangements have been proposed for threading magnetic tape from a cassette. Such mechanical arrangements involve mechanical guide elements and linkages which extract a length of magnetic tape from a cassette and which move the tape to a final tape transport path. The path is defined by the guide elements and includes one or more magnetic heads. The mechanical arrangement must then provide for guiding the tape during transport past the magnetic head. Both the tape threading operation and the tape transport operation typically requires some components of the overall mechanism to be employed in one operation but not in the other operation. For example, one or more motors and associated linkages may be used for a tape threading operation but play no part in the tape transport operation. During threading operation, the various linkages and guide elements are moved over considerable distances and must be accurately located to establish a tape guide path which permits accurate recording and playback of information on the magnetic tape. Purely mechanical tape threading mechanisms are both expensive and complex and tape threading and unthreading is relatively time consuming. The following patents are illustrative of mechanical tape threading and guiding arrangements: U.S. Pat. Nos. 3,674,942, issued Jul. 4, 1972, Inventors—Sugaya et al.; 4,259,700, issued Mar. 31, 1981, Inventors—Galue et al.; 4,642,706, issued Feb. 10, 1987, Inventors—Vollmann et al.; 4,541,024, issued Sep. 10, 1985, Inventor—Sieven; and 3,678,217, issued Jul. 18, 1972, Inventor—Kihara.

In order to ameliorate the problems associated with mechanical threading arrangements for magnetic tape recorders, various techniques have been proposed for pneumatically threading magnetic tape into a magnetic tape recorder from a cassette or cartridge. Thus, U.S. Pat. No. 4,620,678, issued Nov. 4, 1986, Inventors—Kumakura et al. discloses a cartridge loading system wherein magnetic tape contained in a single reel cartridge is threaded into a transport mechanism having a take-up reel. Threading is effected by means of air streams which carry a leading end portion of the magnetic tape from an open supply reel via a channel to a take-up reel until the leading end portion is wound around the take-up reel hub. U.S. Pat. Nos. 4,413,293, issued Nov. 1, 1983, Inventor—Hathaway; 3,940,791, issued Feb. 24, 1976, Inventors—Kayan et al. and IBM Technical Disclosure Bulletin, Volume 12, Number 6, pp. 808 and 809, dated Nov. 19, 1969, disclose arrangements for automatically threading tape contained in a two-reel cassette into a magnetic tape transport containing a helical scan magnetic head assembly or the like. The pneumatic threading arrangements disclosed in the former two patents are disadvantageous because the individually movable guide elements disclosed in these references are complex and subject to reliability problems.

Besides effecting threading of magnetic tape into magnetic tape recorder transport path, various arrangements have been proposed for using vacuum columns and the like to effect control of magnetic tape as it is transported along a path from one reel to another. Such vacuum column arrangements are disclosed, for example, in U.S. Pat. Nos. 3,134,527, issued May 26, 1964, Inventor—Willis; 3,134,528, issued May 26, 1964, Inventor—Vickey; 2,952,010, Sep. 6, 1960, Inventors—Verner et al. A combined pneumatic threading and guiding arrangement is disclosed in commonly assigned U.S. Pat. Nos. 4,779,150, issued Oct. 18, 1988, Inventor—Grant; 4,772,969, issued Sep. 10, 1988, Inventor—Grant; and 4,763,210, issued Aug. 9, 1988, Inventor—Grant. The arrangements disclosed in the latter three patents require the application of a vacuum during both the threading and tape transport operations.

There is thus a need for a helical scan magnetic tape recorder which is reliable and cost effective, which has a minimum of components and in which tape threading and guiding is simple and reliable and in which tape threading is effected in a fast and gentle manner while minimizing stress or edge damage to the tape.

SUMMARY OF THE INVENTION

According to the present invention, there is provided a helical scan magnetic tape recorder which includes tape threading and guiding apparatus for threading magnetic tape from a cassette about a rotary head scanner and for tensioning the tape during tape transport. The threading and guiding apparatus include supply and take-up compliance elements which are each mounted for movement between (1) a cassette loading position behind a tape span in a magnetic tape cassette; (2) a tape vacuum loading position, in which the compliance elements draw tape out of the cassette and partially contact it with the rotary head scanner; and (3) an operating position in which the compliance elements draw tape around respective supply and take-up capstans and tension the tape during tape transport past the rotary head scanner.

BRIEF DESCRIPTION OF THE DRAWINGS

In detailed description of the preferred embodiments of the invention presented below, reference is made to the accompanying drawing in which like numerals refer to like elements.

FIGS. 1, 2 and 3 are respective diagrammatic plan views of an embodiment of the present invention useful in describing the operation thereof.

FIGS. 4 and 5 are elevational views useful in describing the operation of the moveable guide elements.

DESCRIPTION OF THE PREFERRED EMBODIMENTS

Figure 1:
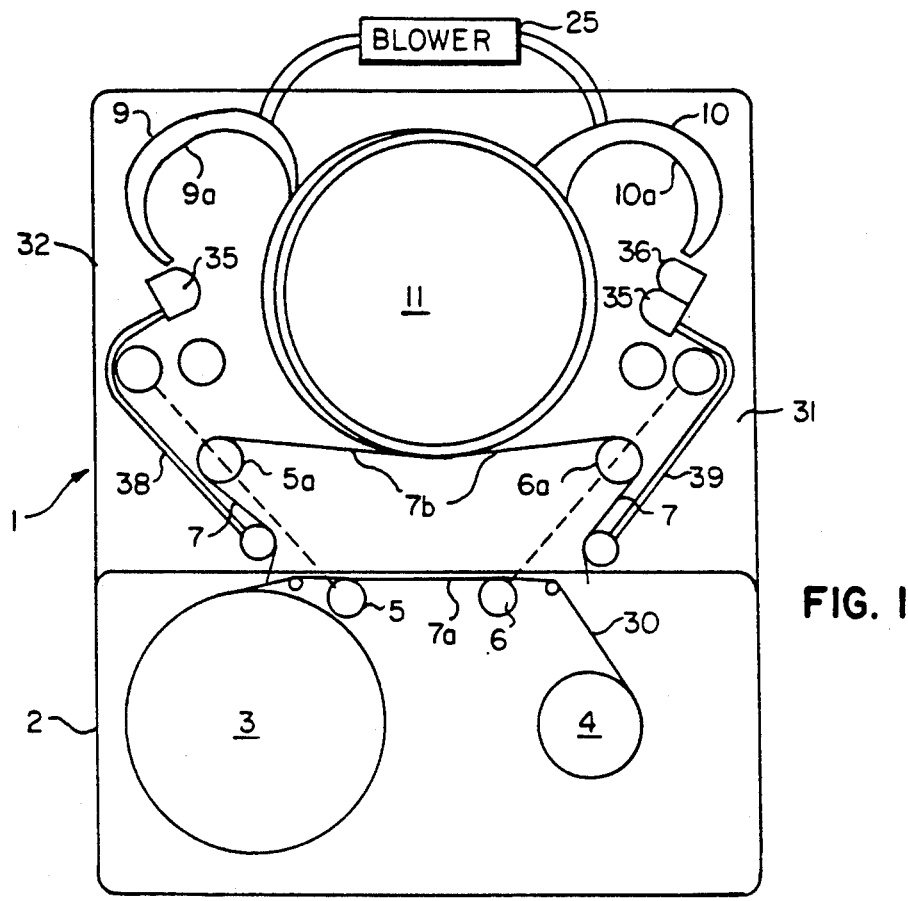

Referring now to the figures, there is shown a preferred embodiment of the present invention. As shown, a helical scan magnetic tape recorder includes tape transport 1 which receives magnetic tape cassette 2. Cassette 2 contains reels 3 and 4 of tape 30, and provides a protective enclosure for carrying, storing and handling the tape without the operator touching it. Likewise, it is very desirable that the operator not touch the tape in loading it into the transport. Rollers 5 and 6 are a part of the tape transport 1 and are so located that when the cassette is installed on transport 1, the tape strand 7A from tape reel 3 to tape reel 4 comes in front of rollers 5 and 6. When the cassette 2 is in place, rollers 5 and 6 are motor driven to positions 5A and 6A by a motor and mechanism described in greater detail hereinafter. Tape 30 is withdrawn from the cassette 2 to a position shown by the tape strand 7B. The space on the transport 1 traversed by the tape 30 is surrounded by a floor 31 a covering above (not shown) and a surrounding wall 32. Vacuum cavities 9 and 10 are located contiguous to and on opposite sides of, rotary head scanner 11. A blower 25 vents cavities 9 and 10 to create a vacuum therein. The vacuum draws air through respective perforated walls 9A on the supply tape side and 10A on the take-up tape side.

Figure 2:
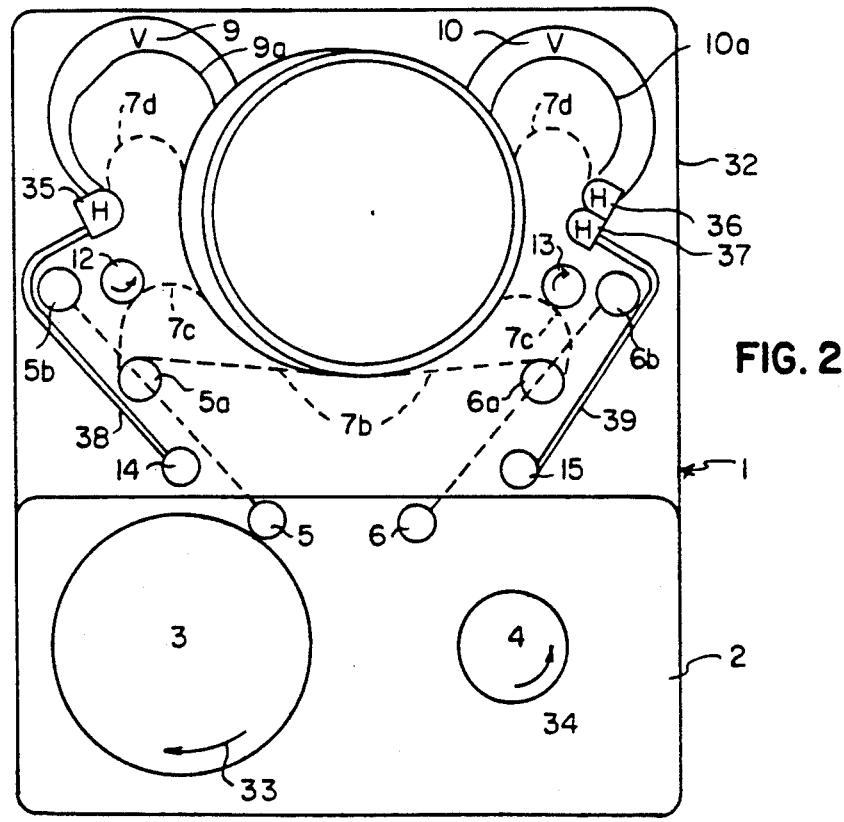

When the tape 30 has been pulled by rollers 5 and 6 to positions 5A and 6A (FIG. 1) and the tape 30 is in position 7B against the scanner 11, the vacuum blower 25 is turned on. The tape spooling reels 3 and 4 are also motor driven slowly in the unspooling direction shown by the arrows 33, 34 (FIG. 2) so the tape 30 goes slack. The low tension present in the tape strand 7A results from the air flow through walls 9A and 10A into the vacuum cavities 9 and 10. This draws the slack tape 30 into position 7C (FIG. 2) where it begins to wrap on the scanner 11 and comes into contact with the supply capstan 12 and the take-up capstan 13. The capstans 12 and 13 can be motor driven slowly in the direction of the loading tape movement to aid the tape threading.

As the tape 30 is drawn to positions shown by 7D, it wraps on the scanner 11 and comes into contact with the fixed heads 35, 36, 37. As the tape approaches the wall 9A on the supply side and the wall 10A on the take-up side, it will contact the portion of the walls 9A, 10A near the scanner 11 first, because that portion has a larger radius and hence results in a higher tension to pull the tape 30 into place.

The walls 9A and 10A are curved to bring the tape 30 past the position of guiding elements 16-21 (FIG. 3) which are positioned out of the tape path during threading. In addition, walls 9A and 10A are twisted laterally so that the tape 30 that approaches the scanner 11 from wall 9A is pointed upward about 5° to conform to the helix angle of the tape 30 on the scanner 11. Similarly, the tape 30 between wall 10A and the scanner 11 points downward about 5° to conform to the helix angle of the tape on the scanner 11 in operation.

Since the scanner 11 is tilted, e.g., at 12° to the right (as shown in the figures), the tape helix, which progresses upward in the counter clockwise direction will deviate from the plane of the page and from the floor or cover of the tape path enclosure. This enclosure confines the air space to cause the air to act effectively on the tape. The enclosure consists of surrounding walls which include curved walls 9A and 10A and additional walls 38, 39. Walls 38 and 39 run respectively from the heads 35, 37 on both sides of the scanner and extend outside of the extractor rollers 5A and 6A positions and the positions where these rollers 15, 16 become compliance rollers (at 5B and 6B) and finally, to the cassette tape exit control rollers 14 and 15. In addition, the enclosure has a floor 31 (in the plane of the paper) which is recessed in area 13 adjacent to the scanner 11 and a top cover (not shown) which is recessed in area 12 adjacent to the scanner. These recesses are to accommodate the deviation of the tape helix from the plane of the floor and top cover. (These surfaces are called floor and cover to refer to the drawing—in actual use the recorder can be used in any orientation.)

Within the vacuum cavities 9 and 10, there are optical sources and sensors (not shown) to sense when the tape 30 is completely in position against the walls 9A and 10A. When this is verified, elevator 40 and 41 (FIGS. 4 and 5) (not shown) are actuated to lower guide posts 16 and 17 and entry roller 18 and exit roller 19 and adjacent rollers 20 and 21. Items 16, 18 and 20 are on elevator 40 and items 17, 19 and 21 are on elevator 41. When guides 16 and 17 and rollers 18, 19, 20 and 21 are in place (FIG. 5), the vacuum blower 25 (FIG. 1) is turned off as the tape is tensioned by rotating the reels 3 and 4 in the spooling direction. Capstans 12 and 13 are also rotated, to take up the slack of tape 30 and to move the tape segments 22 and 23 tightly into position around the guiding elements 16 thru 21 recently brought into place.

The tape unthreading process uses the opposite sequence of events. Blower 25 is activated to create a vacuum to draw the tape 30 against walls 9A and 10A. Elevators 40, 41 move items 16 through 21 out of the tape path and the tape 30 is withdrawn into the cassette 2 with opposite sequence of events to that with which it was extracted.

Referring now to FIGS. 6-12, there will be described a preferred embodiment of the tape threading and guiding apparatus of the present invention. The apparatus shown has the following features and advantages:

1. Magnetic tape contained in a received cassette is removed from the cassette and supported at an operating position in an efficient and reliable manner.

2. A locking/unlocking device of a cassette loader is properly activated to allow a cassette to be loaded and unloaded relative to the tape recorder.

3. The tape is drawn from the cassette into a proper vacuum loading position to allow tape to be drawn by vacuum around the capstans, rotary head scanner and tape guide elements.

4. The tape compliance elements are stopped in final operating positions and locked in place.

5. While locked in operating positions, the compliance elements are adjustable to allow tape guiding (tracking correction) and act to tension the tape while it is moving.

6. Compliance element is sensed both when no tape tension is applied and when tension is applied to maintain correct tension. Tape tension is also adjustable.

Figure 6:
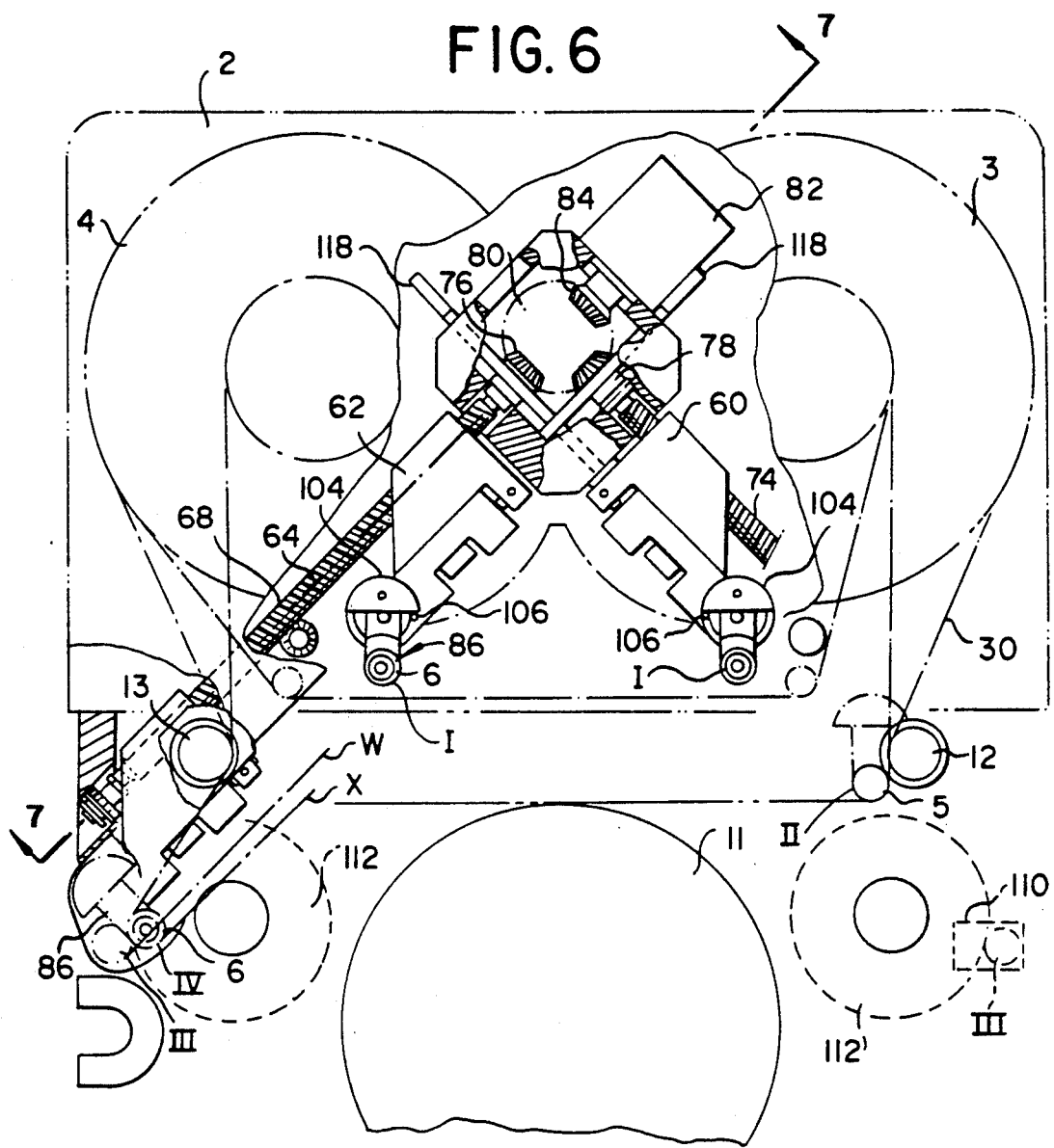
FIG. 6 is a diagrammatic plan view showing an embodiment of the present invention.
Figure 7:
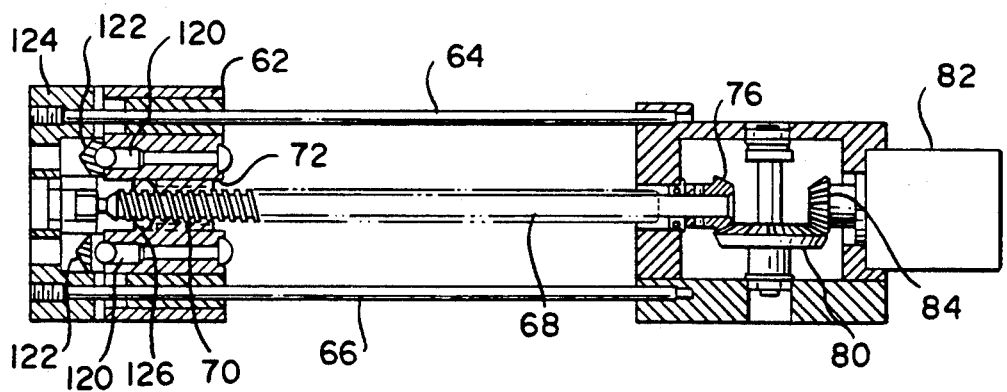
FIG. 7 is a sectional, elevational view taken along line 7—7 in FIG. 6.

As shown in FIG. 6, compliance rollers 5 and 6 (elements) are respectively mounted on carriages 60 and 62, and carriage 62 rides on rails 64 and 66 (FIG. 7) and is driven in opposite directions by threaded shaft 68 threaded through nut 70 as nut 70 is held from turning in carriage 62 by a double sided "D" hole 72. Similarly, carriage 60 is driven in opposite directions by a threaded shaft 74 threaded through a nut (not shown) held in carriage 60. The driving ends of shafts 68 and 74 have respective pinion gears 76 and 78 which engage bevel gear 80. Bevel gear 80 is driven by direct current motor 82 through pinion gear 84.

Compliance rollers are moved between (1) a cassette loading position in which rollers 5, 6 are positioned behind a span of magnetic tape in cassette 2; (2) a tape vacuum loading position II in which rollers 5, 6 have drawn tape out of cassette 2, and partially contacted tape 30 with rotary head scanner 11; and (3) an operating position in which rollers 5, 6 draw tape 30 around capstans 12, 13 and tension the tape during transport past rotary head scanner. These threading positions are effected by motor 82 turning in a counterclockwise (CCW) direction which drives pinion gear 82, bevel gear 84, pinion gears 76, 78 and shafts 68, 72 which move carriages 62, 60. Reversal of motor 82 effects unthreading movement of carriages 62, 60 and compliance rollers 5, 6 from their operating positions III to their cassette loading positions I at which tape 30 is drawn back into cassette 2.

Optical switches such as switch 90 (FIG. 12), mounted on bracket 91 on floor, are located at positions I, II, III in the paths of carriages 62, 60 which carry respective actuators 92, 94. Actuators 92, 94 pass into slots 96, 98 of switch 90 to block passage of light and thereby actuate the switch.

Figure 9:
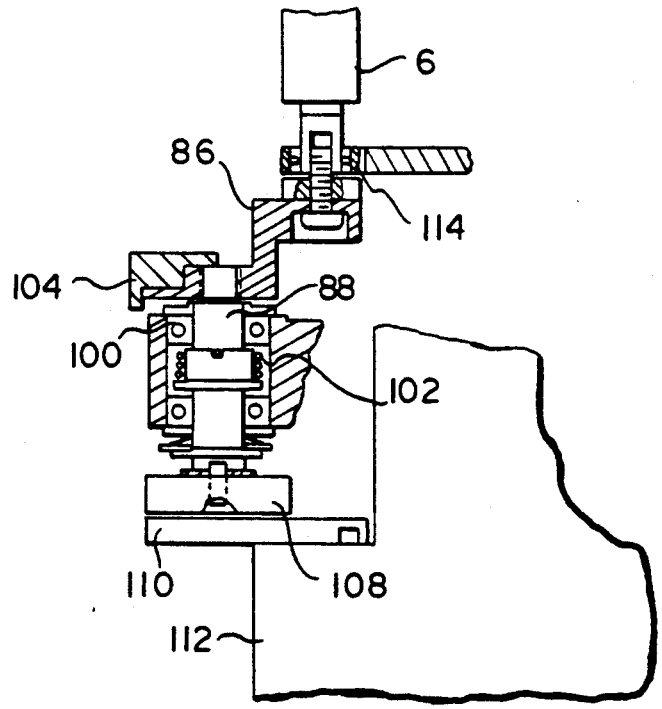
FIG. 9 is a sectional, elevational view of the assembly of FIG. 6.

As shown in FIG. 9, compliance roller 6 is mounted on arm 86 fixed to shaft 88 which is rotatably mounted by bearing 100 to carriage 62. Arm 86 is biased by a torsional spring 102 which loads static balance weight 104 against a stop pin 106 (FIG. 6). Spring 102 has the correct spring rate to apply, e.g., 3 to 4 oz. of tension to tape 30 when roller 6 is rotated to position IV when tape is transported. This position is located by magnet assembly 108 mounted on shaft 88 and analog magnetic position sensor 110 mounted on capstan motor 112. The voltages from sensors 110 to the supply and take-up motors 112 are varied with a slight change in position of compliance roller 6, 5, thus holding rollers 6, 5 in operating position IV.

Arm 86 is held by spring 102 so that weight 104 engages stop 106, in order that arm 86 will miss capstan motor 112 when it passes it during movement to position III.

If for some reason the tape tension is applied to the tape causing the compliance arm 86 (FIG. 8) to go to position IV (FIG. 6), the roller 6 (5) would hit the capstan motor 112 (see FIG. 6, ref line X). Due to this, a roller assembly 114 is added to the compliance arm 86 (FIG. 9) with a diameter that is larger than the roller 6. Now when arm 86 passes the capstan motor 112 in position III, motor 112 will hit the larger roller diameter 114 and cause the compliance arm 86 to move in an A or B direction (FIG. 11) depending on whether carriage 62 is moving forward toward operating position II or returning to cassette loading position I. This allows the whole carriage assembly 62 to pass by capstan motor 112 without hitting the roller 6.

In addition, this same roller assembly 114 is used to rotate compliance arm 86 away from the cassette 2 only on the right-hand side (FIG. 6). This is due to the cassette 2 not being symmetrical. Thus, the cassette 2 on the right-hand side (FIG. 11) is closer to the roller assembly of the compliance arm assembly 86 and could hit the cassette 2 (see line Z in FIG. 11). The roller assembly 114 will hit cam surface 116, rotating the compliance arm assembly 86 in the B direction (FIG. 11), causing the roller assembly 86 to move away from the cassette 2, keeping the roller 6 from hitting the cassette 2.

As the compliance arm carriage 62 (FIG. 6) comes back to the cassette loading position I during unthreading, it will actuate a shaft 118 FIG. 6, 2 places, which will activate a linkage (not shown) which will unlock the locking device of cassette loader allowing cassette 2 to be loaded.

When the compliance arm carriage 62, 60 comes to the operating position III, the ball alignment 120 (FIG. 7) engages the receiver (cone) 122 which is located in the stationary bracket 124 and the other ball alignment 120 engages the receiver (V block) 122. The center line of cone 122 and the V block 122 are the same and is located perpendicular to the mounting datum plane of the transport 1 since the nut 70 (FIG. 7) is spring loaded with crescent washers 126. The spring washers 126 should deflect a total of 0.066" to pre-load the compliance arm carriage 60, 62 to approximately 1.75 lbs. This will keep the compliance arm assembly 60, 62 solid and free from movement while operating in position IV.

Figure 8:
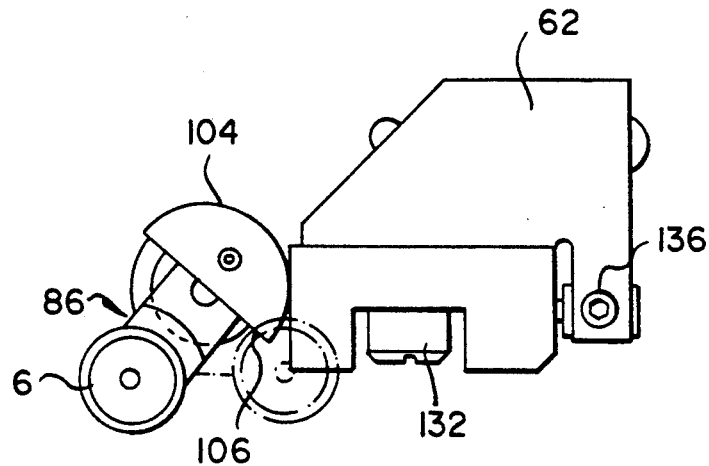
FIG. 8 is a plan view of a compliance element assembly of the embodiment of FIG. 6.
Figure 10:
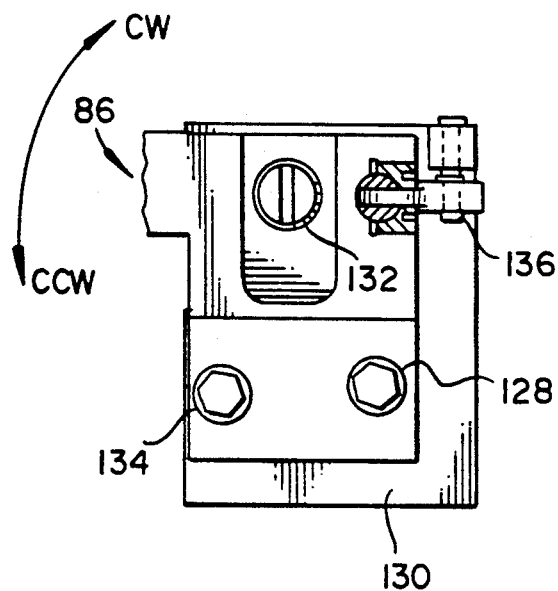
FIGS. 10, 11 and 12 are respectively top plan, top plan, and elevational views of segments of the embodiment of FIG. 6.
Figure 11:
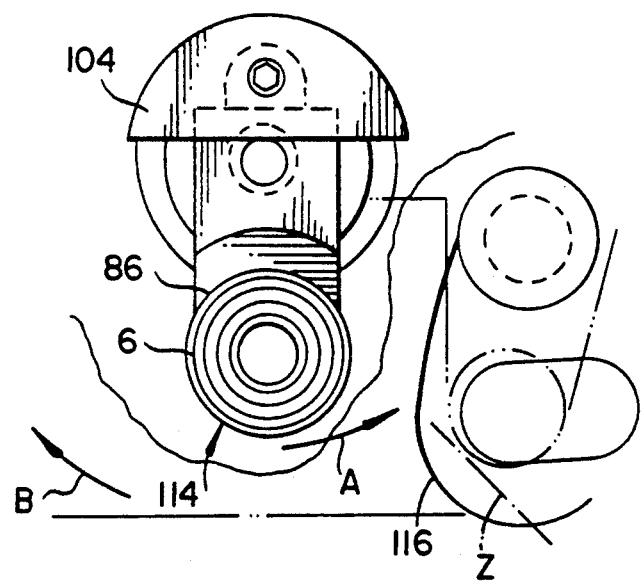
Figure 12:
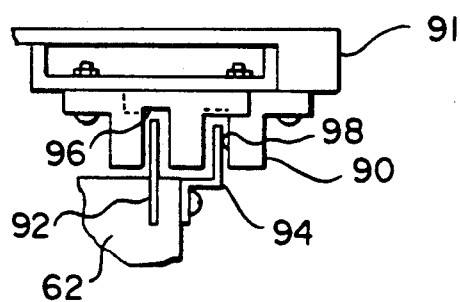

Referring now to FIGS. 8 and 10, the bearing housing compliance arm 128 is attached to block 130 by a shoulder screw 132 which allows the bearing housing compliance arm 128 to rotate when the hex head screws 134 are loosened. The hex head screws 134 are necessary to be able to use a very thin open end wrench because of the very small amount of room between the compliance arm assembly 62, 60 (FIG. 6) and the capstan motors 112. The bearing housing compliance arm assembly 128 can be tilted slightly by using an allan wrench in the socket of the adjusting screw 136. Turning adjusting screw 136 should turn bearing housing compliance arm assembly 128 clockwise around shoulder screw 132. Turning adjusting screw 136 counterclockwise should turn bearing housing compliance arm assembly 128 counterclockwise. When the roller 6 (FIG. 6) is in the position IV, the hex head screws 134 are loosened very slightly. By using an allan wrench on the socket of screw 136, the roller 6 can be adjusted to correct tape tracking while tape 30 is moving. This direction of adjustment is parallel with the direction of tape travel, so a slight movement of the roller 6 clockwise or counterclockwise will cause the roller 6 to move up or down. Thus, the tape guiding can be adjusted while moving in the operating mode. When the tape 30 is guiding correctly, the hex head screws 132 are tightened.

The invention has been described in detail with reference to the figures, however, it will be appreciated that variations and modifications are possible within the spirit and scope of the invention.

What is claimed is:

1. A helical scan magnetic tape recorder including a rotary magnetic head scanner and means spaced from said rotary scanner for receiving a cassette including spaced, coplanar, supply and take-up reels having magnetic tape spooled on said reels with a span of magnetic tape extending between said reels, tape threading and guiding apparatus comprising, supply and take-up capstans spaced from said cassette and said rotary scanner;

supply and take-up compliance elements;

means for counting said supply and take-up compliance elements for movement (1) between cassette loading positions in which said elements are located behind said tape span of a received magnetic tape cassette, (2) tape vacuum loading positions in which said elements draw said tape out of said cassette and partially contact said tape with said rotary head scanner, and (3) operating positions in which said elements draw said tape around said respective capstans and tension said tape during tape transport past said rotary head scanner;

wherein said mounting means includes supply and take-up carriages respectively supporting said supply and take-up guide elements and further includes supply and take-up drive means respectively coupled to said supply and take-up carriages for driving said carriages between said positions; and wherein said drive means include divergent screw drives engaging said respective carriages, a reversible motor, and a gear assembly for connecting said motor to said screw drives, wherein rotation of said motor in one of said reversible directions causes said screw drives to drive said carriages in a threading direction and wherein rotation of said motor in the other of said reversible directions causes said screw drives to drive said carriages in an opposite unthreading direction.

2. The apparatus of claim 1 wherein said mounting means moves said guide elements in respective linear divergent directions between said cassette loading position, said tape vacuum loading position and said operating position.

3. The apparatus of claim 1 wherein said supply and take-up guide elements are swingably mounted on said respective carriage and include biasing means for biasing each element so as to tension tape guided by said element.

4. The apparatus of claim 1 wherein said gear assembly includes a bevel gear and pinion gears which engage said bevel gear and which are respectively rotatably mounted on said screw drives and on said motor.

* * * * *